Patented Apr. 27, 1954

2,676,961

UNITED STATES PATENT OFFICE 2,676,961

PROCAINE-PENICILLIN PREPARATION

Simon L. Ruskin, New York, N. Y., assignor to Physiological Chemicals Company, New Rochelle, N. Y., a corporation of New York No Drawing. Application November 16, 1948, Serial No. 60,415

1 Claim. (Cl. 260—239.1)

The present invention relates to the manufacture of a penicillin preparation characterized by improved stability and by an extended period of physiological activity whereby the frequency of administration of the penicillin may be reduced.

The present application is a continuation-in-part of my co-pending applications Serial Number 579,695, filed February 24, 1945, and Serial Number 595,885, filed May 25, 1945, both now abandoned.

It is known that penicillin is a highly unstable material and rapidly loses potency both in the solid form and in solution, particularly, in the latter form. Its aqueous solution loses its antibiotic action so rapidly at room temperatures that its employment has been virtually restricted to hospitals and physicians' offices because of the care with which it must be stored and prepared for use.

Another serious difficulty encountered in the use of penicillin is that it is rapidly excreted so that injections of the drug must be repeated about every three to six hours, which makes its use inconvenient and expensive, while the pain of injection must be undergone by the patient with equal frequency.

Various attempts to stabilize penicillin by converting it into a metal salt to enable it to be marketed in solid form have not been entirely successful. Thus the sodium salt is highly hygroscopic and rapidly loses strength on the accretion of moisture; and even in the solid condition it must be stored in the refrigerator to prevent rapid loss of potency.

It is accordingly the general object of the present invention to provide therapeutic compositions containing penicillin which are characterized by the capacity for maintaining their potency over a relatively long period of time even when exposed to the air and to room temperature.

More particularly, it is an object of the present invention to provide therapeutic preparations of pencillin which on injection into the animal body are excreted more slowly than penicillin or its sodium salt, so that a high level of penicillin in the blood stream is maintained for a longer period of time, whereby the frequency of injection is materially reduced.

It is a further object of the invention to provide therapeutic compositions containing penicillin and also a salt of ascorbic acid whereby an improved therapeutic action is obtained.

More specifically, it is an object of the present invention to provide therapeutic compositions for external, but more particularly for internal use and comprised essentially of penicillin and procaine, with or without a soluble salt of ascorbic acid such as alkali and alkaline earth metal salts, and particularly the sodium and calcium salts of ascorbic acid, such preparations being characterized by improved stability on storage either in the dry condition or in solution form, and by the capacity, particularly on injection, of maintaining a high level of penicillin in the blood stream for a period of time considerably in excess of that obtained, for example, by the injection of penicillin or its sodium salt.

A still further object of my invention is to provide an improved vehicle for my stable procaine penicillin, whereby the full effect of a depot mechanism can be obtained when the drug is administered parenterally.

I have found that when pencillin or its salts are mixed or reacted with procaine or a salt or procaine, preferably procaine ascorbate, compositions are obtained which are highly stable even in aqueous solution and generally also at room temperature, the product being characterized by the antibiotic action of the penicillin to a practically undiminished degree and for a longer period of time than is the case with penicillin itself, or the salts thereof presently in use such as the sodium salt. In preparing the compositions of the present invention, there may be employed penicillin itself, its various soluble salts like the sodium, ammonium and calcium salts, and likewise acyl derivatives thereof, like the acetyl, propionyl and benzoyl compounds.

While the preparations of the present invention may be prepared by mixing together penicillin, or its derivative, and procaine, or its derivative, the mixture to be dissolved in sterile water, when it is to be injected, I prefer to mix the materials in solutions to effect combination of the penicillin with the procaine directly or by double decomposition where derivatives of the two substances are employed. In this way, a product is obtained which appears to be a chemical compound, namely, procaine-pencillin salt (or penicillin-procaine salt), wherein the procaine and penicillin are combined in equimolecular proportions, and which can be obtained in crystalline form. It is, however, not absolutely necessary that all of the pencillin be combined with procaine, as I have found that less than equimolecular proportions of procaine with reference to the pencillin are able to stabilize pencillin, or its salts, and retard its excretion from the body, such stabilization being effective not only in connection with solutions of the preparation, but also when the preparation is in dry form, or in the form of an ointment or salve, on admixture with the various known ointment vehicles.

As above indicated, the preparations of the present invention may be prepared by mixing a soluble metal salt of penicillin with procaine, preferably with a salt of procaine. A highly satisfactory composition is obtained when a soluble metal salt of penicillin is mixed or combined with procaine ascorbate, as the resulting metal ascorbate possesses desirable physiological activity and the several compounds exert a mutually stabilizing action on each other. Where metal salts like sodium chloride are produced by reacting, for example, sodium penicillin with procaine hydrochloride, or even where a metal salt of ascorbic is produced, the procaine-penicillin compound can be separated from the metal salt by fractional crystallization, by fractional precipitation with suitable organic solvents, or in other ways familiar to chemists.

The procaine-penicillin preparations of the present invention are of particular utility in surgery as they have the important advantage of forming self-stabilizing solutions while simultaneously protecting the surgical area from the very moment of surgical invasion. Procaine-penicillin has a satisfactory degree of solubility and it is effective even in the presence of pus and wound secretions which would inactivate sulfonamide drugs. Thus, in a tonsillectomy, where an infected area is being surgically treated, procaine-penicillin diminishes the danger of admission of organisms to the systemic circulation. Where the procaine-penicillin is prepared by combining procaine ascorbate with calcium penicillin, the calcium ascorbate contained in the solution of the reaction products is a valuable adjuvant as its aids in promoting healing of wounds.

I have found by the use of preparations consisting of or containing procaine-penicillin, only about 40% or even less of the penicillin will be excreted in the urine in 24 hours. It appears that the procaine compound of penicillin becomes slowly hydrolyzed in the body, yielding free penicillin so that procaine-penicillin may be regarded as acting as a reservoir or depot which only gradually releases the penicillin, in consequence of which a single dose is active over a longer period of time.

It is known that by suspending medicaments in oils that are not irritating to body tissues, such as peanut, sesame or olive oil, the rate of utilization of the medicament can be substantially delayed and a more continuous blood level of the medicant obtained, thus obviating high frequency of parenteral injection.

I have found that by controlling the rate of oxidation breakdown of oils, the rate of absorption of the oil from the injected site in the tissues can be markedly delayed and the rate of absorption of the medicament still further retarded without causing any tissue irritation. To accomplish this I inhibit the physiological breakdown of the oil by the addition of non-toxic phenolic and acidic substances that have essentially an antioxygenic action, such as tocopherol and ortho and para hydroquinones, and also tocoquinone.

To enhance this inhibitory action, I employ synergists in the form of organic acids having a reducing action, like ascorbic acid and glutathione, and polybasic inorganic acids, such as phosphoric acid. These reducing synergists simultaneously have a further stabilizing effect on the procaine-penicillin itself. Thus, I have found that the addition of 0.05% to 0.1% of tocopherol will delay the absorption of sesame oil from 12 to 24 hours while the addition of 0.1 to 0.5% ascorbic acid will further increase the tocopherol effect so as to delay absorption to from 36 to 48 hours and at times to 96 hours.

The net result of this inhibitory effect by the antioxidant tocopherol and synergistic ascorbic acid is to prolong the presence of the procaine-penicillin depot in the tissues and reduce the number of injections required for a therapeutic penicillin effect to one in 48 to 72 hours with good assurance of a satisfactory blood level of penicillin. Since these substances are all physiologically non-toxic they are highly desirable for this purpose.

The following examples illustrate satisfactory procedures for the manufacture of procaine-penicillin and of injectible preparations containing the same, but it is to be understood that they are presented only for purpose of illustration and not as indicating the limits of the invention.

*Example 1*

To 100 cc. of aqueous solution containing 1 g. of procaine ascorbate are added 300 mg. of calcium penicillin. A bright yellow solution results which contains 4,500 units of penicillin per cc. To this solution are now added 7 g. sorbose. The solution is stable and may be put up in ampoules in an atmosphere of nitrogen.

Alternatively, penilic acid can be reacted with procaine base, whereby the procaine penicillin is produced. Solutions of procaine-penicillin are preferably kept at a temperature of about 2° C. till ready for use.

*Example 2*

2.97 g. (0.01 mole) of penicillin and 2.36 g. (0.01 mole) of procaine were dissolved in approximately 50 cc. of chloroform and the reaction mixture concentrated in vacuo to dryness. A crystalline salt was obtained which analyzed for the equimolecular salt of procaine-penicillin.

The compound can also be isolated by treating the chloroform solution with an excess of petroleum ether and centrifuging and filtering the precipitate.

As indicated above, while I prefer to prepare the procaine salt of penicillin because of the greater stability of such compound, useful preparations may be obtained by mixing procaine, or a non-toxic acid salt thereof, in the dry condition, with penicillin or a metal salt thereof, such preparation yielding procaine-penicillin on mixing with water prior to injection.

*Example 3*

Thirty (30) million units of procaine-penicillin were suspended in 100 cc. of peanut oil to which had been added .05 gram alphatocopherol and 0.1 gram ascorbic acid. The suspension was thoroughly shaken. One cc. of this composition injected intramuscularly supplied a depot containing 300,000 units, sufficient to maintain a therapeutic blood level for 36 to 48 hours and at times to 72 or 96 hours.

*Example 4*

Thirty (30) million units of procaine-penicillin were suspended in 100 cc. of sesame oil to which had been added .05 gram of tocopherol (alpha, beta or delta or a mixture) and 0.1% phosphoric acid. The suspension was thoroughly shaken. One cc. of this composition injected intramuscularly supplied a depot of 300,000 units of penicillin that maintained a therapeutic blood level for 36 to 48 hours, and at times to 72 or 96 hours. In the use of the phosphoric acid, a reducing effect favorable to the penicillin potency seems to be derived from the hydrogen of the fat substrate itself, so that the fat substrate serves as a hydrogen donor.

I claim:

Procaine salt of penicillin.

References Cited in the file of this patent

UNITED STATES PATENTS

| Number | Name | Date |
|---|---|---|
| 2,233,417 | King | Mar. 4, 1941 |
| 2,515,898 | Rhodehamel | July 18, 1950 |

OTHER REFERENCES

"Proc. Staff. Meet. Mayo Clinic," December 10, 1947, page 567.

Salivar et al., "J. Am. Chem. Soc.," vol. 70, March 1948, p. 1287.

Shannon et al., "Military Surgeon," vol. 95 (1944), page 501.

Hudson, "Proc. Royal Soc. Med. and Therapeutics," vol. 37, January 1944, page 110.

British Report, CMR-Br. 234; CPS-687; PB-79927, December 5, 1947, pp. 1-5.

Jour. Amer. Med. Assn., March 4, 1944, pp. 627-633 (page 628 pertinent).

Chem. and Eng. News, page 3314, November 10, 1947.

Dallemagne et al., "Acide ascorbique, acide dehydroascorbique et action antistaphylococcique de la penicilline in vitro," Compt. rend. Soc. biol., vol. 142, pp. 551-553, April 1948.

Drug Trade News, vol. 22, No. 21, October 20, 1947, pp. 47 and 61.

F. D. C., Reports, Drugs and Cosmetics, vol. 9, No. 35, October 11, 1947, page 4.

The Lancet, November 11, 1944, page 623.

The Pharmaceutical Journal (London), September 23, 1944, p. 124.

Nature, November 10, 1934, pp. 724-725.

U. S. Dispensatory, 23rd Ed. (1943), pp. 17-19.